(12) United States Patent
Kang (10) Patent No.: US 10,295,731 B2
(45) Date of Patent: *May 21, 2019

(54) DISPLAY DEVICE (71) Applicant: Samsung Display Co., Ltd., Yongin-Si, Gyeonggi-Do (KR)

(72) Inventor: Moonshik Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,313

(22) Filed: Apr. 27, 2018

(65) Prior Publication Data

US 2018/0246271 A1    Aug. 30, 2018

Related U.S. Application Data

(63) Continuation of application No. 15/078,025, filed on Mar. 23, 2016, now Pat. No. 9,983,349.

(30) Foreign Application Priority Data

Aug. 31, 2015   (KR) .................. 10-2015-0123048

(51) Int. Cl.
*G02F 1/1333*   (2006.01)
*F21V 8/00*     (2006.01)

(52) U.S. Cl.
CPC .......... *G02B 6/0083* (2013.01); *G02B 6/0091* (2013.01); *G02B 6/0051* (2013.01);
(Continued)

(58) Field of Classification Search
CPC ........ G02F 2001/133302; G02F 2001/133314; G02F 1/133305; G02F 1/133308;
(Continued)

(56) References Cited

U.S. PATENT DOCUMENTS

2012/0069262 A1   3/2012   Kang et al.
2012/0293726 A1   11/2012  Takata
(Continued)

FOREIGN PATENT DOCUMENTS

| JP | 2012-216554 A | 11/2012 |
| KR | 1020120014422 A | 2/2012 |
| KR | 1020120061292 A | 6/2012 |

*Primary Examiner* — Y M. Lee
(74) *Attorney, Agent, or Firm* — Cantor Colburn LLP (57) ABSTRACT

A display device includes a display panel, an accommodating member including a bottom portion and a sidewall extending from the bottom portion, a backlight unit including a light source inside the accommodating member and a light source substrate inside the accommodating member and on which the light source is mounted, and a driving substrate connected to the light source substrate disposed inside the accommodating member. The driving substrate includes a first extending portion disposed outside the accommodating member, a second extending portion extended from the first extending portion and through the sidewall of the accommodating member to dispose an end portion of the second extending portion inside the accommodating member, and a pad portion disposed on a lower surface of the end portion of the second extending portion and inside the accommodating member. The pad portion is electrically connected to the light source substrate disposed inside the accommodating member.

16 Claims, 5 Drawing Sheets

(52) U.S. Cl.
CPC .......... *G02B 6/0053* (2013.01); *G02B 6/0055* (2013.01); *G02B 6/0068* (2013.01); *G02F 2001/133302* (2013.01)

(58) Field of Classification Search
CPC ... G02F 1/1333; G02B 6/0083; G02B 6/0081; G02B 6/0091; G02B 6/0073; G02B 6/0051; G02B 6/0053; G02B 6/0055
See application file for complete search history.

(56) References Cited

U.S. PATENT DOCUMENTS

| | | | |
|---|---|---|---|
| 2013/0027968 A1* | 1/2013 | Urano | G02B 6/0068 362/602 |
| 2013/0223068 A1* | 8/2013 | Choi | G02B 6/0083 362/249.02 |
| 2014/0085564 A1 | 3/2014 | Hendren et al. | |
| 2016/0124139 A1* | 5/2016 | Hattori | G02F 1/133615 362/606 |

* cited by examiner

DISPLAY DEVICE

This application is a continuation application of U.S. application Ser. No. 15/078,025 filed Mar. 23, 2016, which claims priority to Korean Patent Application No. 10-2015-0123048, filed on Aug. 31, 2015, and all the benefits accruing therefrom under 35 U.S.C. § 119, the content of which in its entirety is herein incorporated by reference.

BACKGROUND

1. Field

The invention relates to a display device. More particularly, the invention relates to a display device in which a driving substrate is connected to a light source substrate.

2. Description of the Related Art

In general, a light emitting diode ("LED") has been widely adopted as a light source for a liquid crystal display ("LCD"), e.g., liquid crystal display television ("LCD-TV"), LCD monitor, various lighting devices, etc., instead of a fluorescent lamp due to advantages such as, relatively low power consumption, semi-permanent lifespan, relatively high brightness, etc.

For instance, for an edge-illumination type LED display in which the LED is disposed only at an edge of a display panel, a frame generally includes a bottom chassis, a top chassis and a middle mold, and LEDs are disposed at the edge of the bottom chassis after being mounted onto an LED bar. In particular, a member, which is called an extrusion bar, is assembled with the edge of the bottom chassis, and then the LED bar is coupled to the extrusion bar. The structure of the extrusion bar and the LED bar is similarly applied to the lighting devices, e.g., an LED lamp employing the LED as a light source thereof.

SUMMARY

One or more exemplary embodiment provides a display device for which a driving substrate is connected to a light source substrate having a light source mounted thereon, without using a separate connector element of a conventional display device.

Embodiments of the invention provide a display device including a display panel which displays an image with light, an accommodating member comprising a bottom portion and a sidewall which extends from the bottom portion, a backlight unit which provides the light to the display panel, the backlight unit including a light source which is inside the accommodating member and generates the light and a light source substrate which is inside the accommodating member and on which the light source is mounted, and a driving substrate which is connected to the light source substrate disposed inside the accommodating member and controls the light source to generate the light. The driving substrate includes a first extending portion disposed outside the accommodating member, a second extending portion extended from the first extending portion and through the sidewall of the accommodating member to dispose an end portion of the second extending portion inside the accommodating member, and a pad portion disposed on a lower surface of the end portion of the second extending portion and inside the accommodating member. The pad portion is electrically connected to the light source substrate disposed inside the accommodating member.

The backlight unit further may further include a circuit pattern portion disposed at an end of the light source substrate disposed inside the accommodating member and electrically connected to the pad portion of the driving substrate which is disposed inside the accommodating member.

The sidewall of the accommodating member may be provided in plural to define first sidewalls extending lengthwise in a first direction, and second sidewalls respectively connected to end portions of the first sidewalls and extending lengthwise in a second direction crossing the first direction. The light source substrate disposed inside the accommodating member may extend in the first direction and be disposed adjacent to a first sidewall among the first sidewalls.

The first sidewall disposed adjacent to the light source substrate may define a first opening hole in the accommodating member and through which the second extending portion is extended to dispose the end portion of the second extending portion inside the accommodating member.

The first extending portion may extend lengthwise in the first direction, and the second extending portion may extend lengthwise in the second direction from an end of the first extending portion.

The second extending portion extended through the first opening hole defined in the accommodating member may have a same width in the first direction as a width of the first opening hole in the first direction.

The driving substrate may further include a driving portion which is disposed on the first extending portion disposed outside the accommodating member and applies a source voltage to the light source substrate disposed inside the accommodating member through the pad portion and the circuit pattern portion which are electrically connected to each other.

The driving substrate may further include a first conductive member disposed on the pad portion and in contact with the pad portion, the light source substrate may further include a second conductive member disposed on the circuit pattern portion and in contact with the circuit pattern portion, and the first conductive member may contact with the second conductive member to electrically connect the pad portion of the driving substrate to the circuit pattern portion of the light source substrate.

The first conductive member and the second conductive member may have a same thickness.

The driving substrate may further include a third conductive member in contact with the pad portion, and the third conductive member may extend from the pad portion of the driving substrate to contact the circuit pattern portion of the light source substrate and electrically connect the pad portion of the driving substrate to the circuit pattern portion of the light source substrate.

The third conductive member may define a first extending member thereof in contact with the pad portion, a second extending member thereof in contact with the circuit pattern portion and spaced apart from the first extending member by a predetermined distance to face the first extending member, and a third extending member thereof extending respectively from ends of the first and second extending members and connecting the first and second extending members to each other.

According to one or more exemplary embodiment described above, the light source substrate and the driving substrate are electrically connected to each other using pad and pattern portions thereof without using a separate connector of a conventional display device, and thus the light source substrate may be stably electrically connected to the driving substrate without using the separate connector.

Thus, an assembly time of the display device may be significantly reduced since no separate connector is used, and defects caused by the connector may be reduced or effectively prevented.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

The following description with reference to the accompanying drawings is provided to assist in a comprehensive understanding of various exemplary embodiments of the present disclosure as defined by the claims and their equivalents. It includes various specific details to assist in that understanding but these are to be regarded as merely exemplary. Accordingly, those of ordinary skill in the art will recognize that various changes and modifications of the various exemplary embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 1:
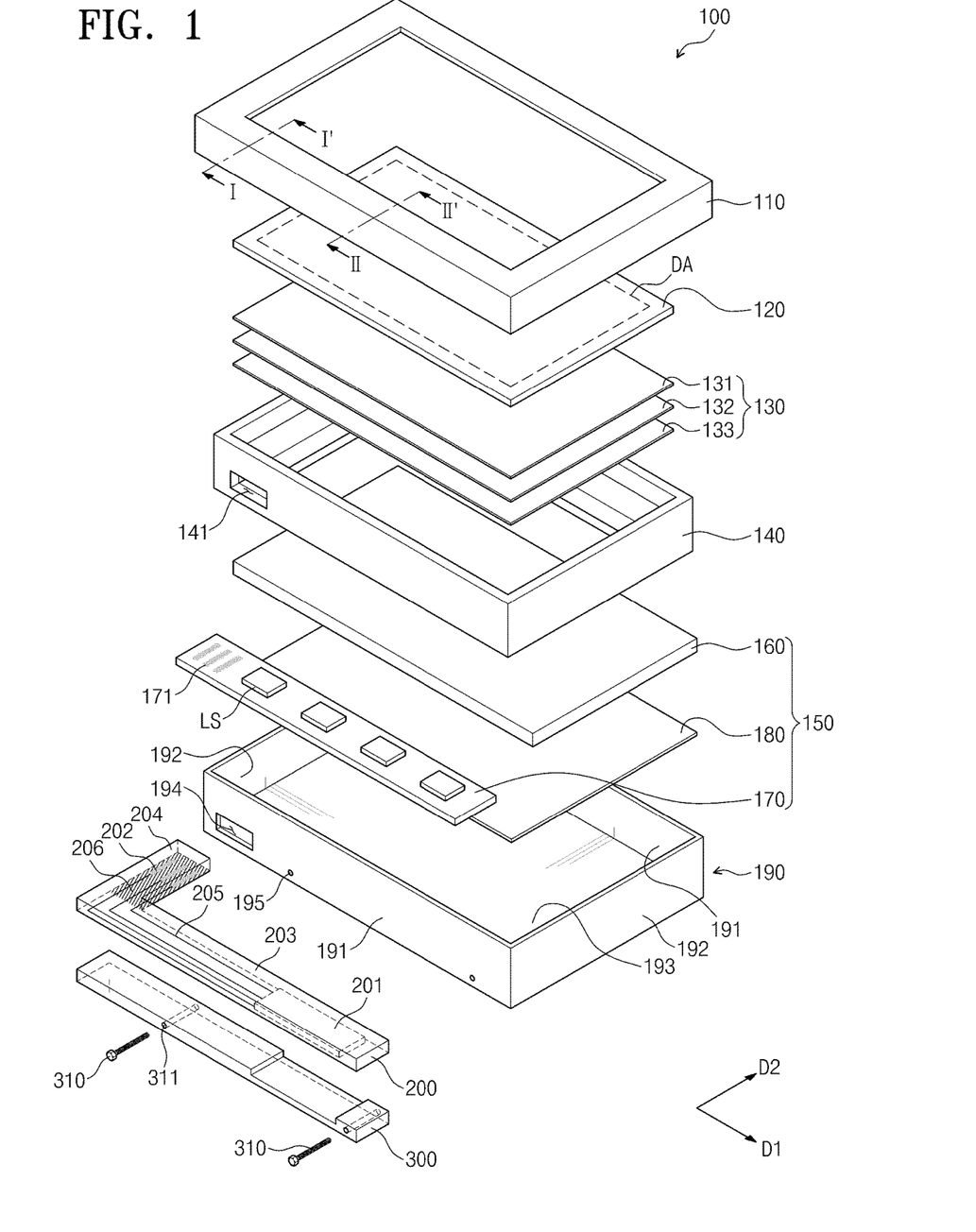
FIG. 1 is an exploded perspective view showing an exemplary embodiment of a display device according to the invention.
Figure 2A:
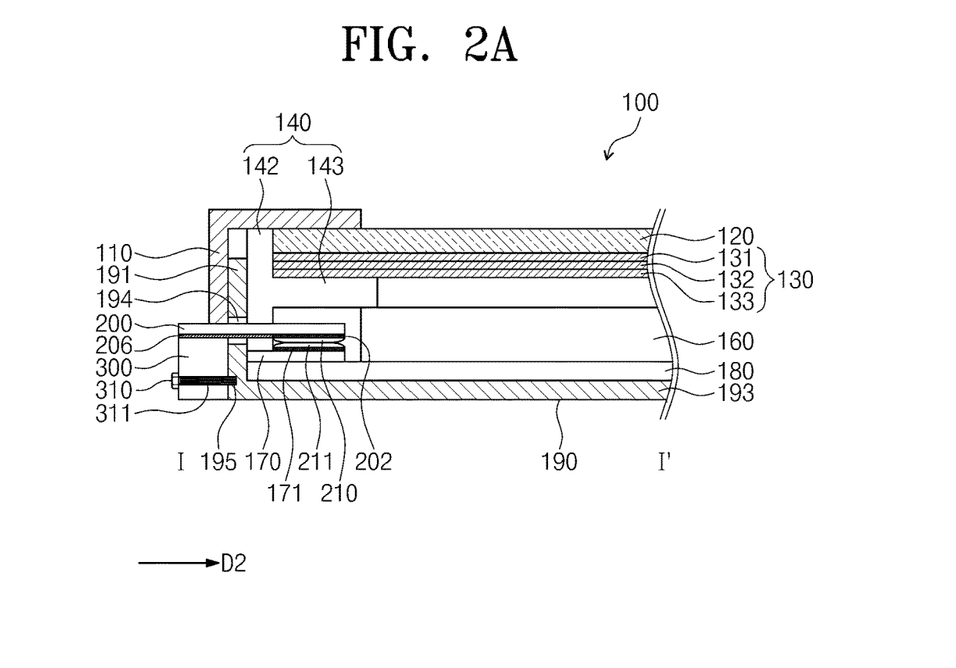
FIG. 2A is a cross-sectional view taken along line I-I' of FIG. 1.
Figure 2B:
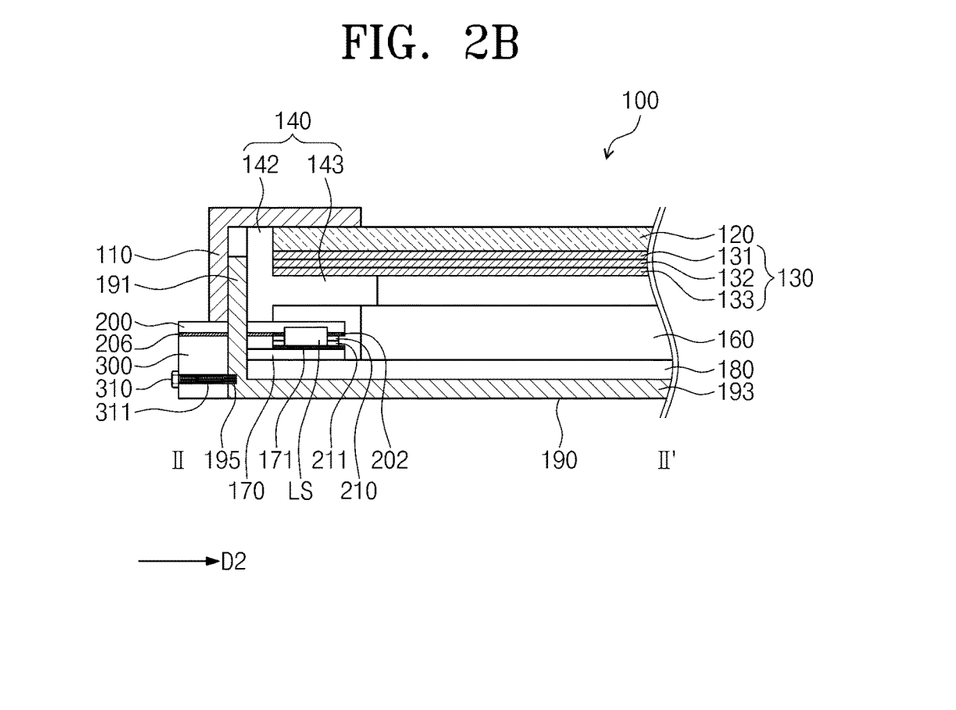
FIG. 2B is a cross-sectional view taken along line II-II' of FIG. 1.

FIG. 1 is an exploded perspective view showing an exemplary embodiment of a display device 100 according to the invention, FIG. 2A is a cross-sectional view taken along line I-I' of FIG. 1, and FIG. 2B is a cross-sectional view taken along line II-II' of FIG. 1.

Referring to FIGS. 1, 2A and 2B, the display device 100 displays an image through a display area DA thereof. The display device 100 includes a covering member 110, a display panel 120, a plurality of optical sheets 130, a mold frame 140, a backlight unit 150, an accommodating member 190 and a driving substrate 200.

The display panel 120 may be, but not limited to, a liquid crystal display panel including a liquid crystal layer, an organic light emitting display panel including an organic light emitting layer, an electrowetting display panel including an electrowetting layer, or an electrophoretic display panel including an electrophoretic display layer.

As an example, the display panel may be, but not limited to, the liquid crystal display panel including a first substrate (not shown), a second substrate (not shown) facing the first substrate, and a liquid crystal layer (not shown) interposed between the first substrate and the second substrate.

The display panel 120 includes or defines the display area DA displaying the image and a non-display area disposed adjacent to the display area DA and in which no image is displayed. The display panel 120 includes a plurality of pixels (not shown) disposed in the display area DA to generate the image.

The optical sheets 130 are disposed under the display panel 120. In the exemplary embodiment, the optical sheets 130 include a diffusion sheet 133 diffusing a light, a prism sheet 132 condensing the light, and a protection sheet 131 disposed on the prism sheet 132 to protect the prism sheet 132.

The prism sheet 132 condenses the light diffused by the diffusion sheet 133 to a direction that is substantially perpendicular to a plane surface of the display panel 120. The light exiting from the prism sheet 132 travels in the direction substantially perpendicular to the plane surface of the display panel 120 by the prism sheet 132, and thus a brightness uniformity and a front brightness of the display device 100 are improved.

The backlight unit 150 is disposed under the display panel 120 to generate and provide the light to the display panel 120. The backlight unit 150 includes a light source LS provided in plural, a light source substrate 170, a light guide plate 160 and a reflection plate 180.

Each of the light sources LS generates and emits the light. In the exemplary embodiment, each of the light sources LS is mounted on the light source substrate 170 and receives a source voltage from the light source substrate 170 to generate the light.

The light sources LS are arranged on the accommodating member 190 at regular intervals.

Thus, the light emitted from the light sources LS is incident to the light guide plate 160. In the exemplary embodiment, each of the light sources LS includes a light emitting diode, but not limited thereto.

The light source substrate 170 extends lengthwise in a first direction D1 and is accommodated at one side of the accommodating member 190. An entirety of the light source substrate 170 is within the accommodating member 190. The light sources LS are mounted on the light source substrate 170 by a surface mount technology ("SMT") in a package form. As another example, the light sources LS may be mounted on the light source substrate 170 by die-bonding and wire-bonding the light sources LS, to electrically connect the light sources LS to the light source substrate 170.

The light source substrate 170 includes a circuit pattern portion 171 disposed at one side thereof, and the circuit pattern portion 171 is electrically connected to the driving substrate 200. The circuit pattern portion 171 makes contact with a pad portion 202 of the driving substrate 200 and provides the source voltage to the light sources LS mounted on the light source substrate 170. That is, the circuit pattern portion 171 and the light sources LS are connected to each other such that the circuit pattern portion 171 provides the source voltage to the light sources LS.

The light source substrate 170 is disposed adjacent to a first sidewall 191 among sidewalls of the accommodating member 190 and on the reflection plate 180. The light source substrate 170 extends lengthwise in the first direction D1 and widthwise in a second direction D2. The light source substrate 170 extends from the first sidewall 191 in the second direction D2. In a cross-sectional thickness direction of the display device 100, the light source substrate 170 is disposed between the reflection plate 180 and the light guide plate 160.

The light guide plate 160 is accommodated in the accommodating member 190 and disposed on the reflection plate 180. The light guide plate 160 guides the light provided from the light sources LS to the display panel 120.

The reflection plate 180 includes a light reflecting material, such as polyethylene terephthalate ("PET"), aluminum, etc., and is disposed on a bottom portion 193 of the accommodating member 190.

The covering member 110 is disposed on the display panel 120 and has a frame shape. A front surface of the covering member 110 is disposed to cover the non-display area of the display panel 120 and the display area DA of the display panel 120 is exposed to outside the covering member 110 without being covered by the covering member 110.

A side surface of the covering member 110 extends downwardly from the front surface thereof to make contact with an outer side surface of the accommodating member 190. Referring to FIGS. 2A and 2B, for example, the side surface of the covering member 110 terminates at an upper portion of the sidewalls of the accommodating member 190 to expose a lower portion of the sidewalls of the accommodating member 190.

The mold frame 140 extends along the sidewalls of the accommodating member 190. The mold frame 140 is disposed inside the first sidewalls 191 and the second sidewalls 192 of the accommodating member 190. The optical sheets 130 and the display panel 120 are seated on the mold frame 140.

Referring to the cross-sectional views of FIGS. 2A and 2B, the mold frame 140 includes a vertical portion 142 disposed inside the sidewalls of the accommodating member 190 and a horizontal portion 143 connected to a predetermined area of a center of the vertical portion 142 and horizontally extending to overlap the display device 100. Portions of the mold frame 140 may define the vertical and horizontal portions 142 and 143 thereof.

The optical sheets 130 and the display panel 120 are disposed on the horizontal portion 143. A predetermined planar area of one side of the light guide plate 160 is disposed under a predetermined planar area of a distal end of the horizontal portion 143. The predetermined area of the distal end of the horizontal portion 143 is disposed to make contact with the predetermined area of the one side of the light guide plate 160. Thus, the light guide plate 160 is held within the backlight unit 150 by the horizontal portion 143 of the mold frame 140 overlapping an edge portion of the light guide plate 160.

The mold frame 140 includes or defines a second opening hole 141 extended through the vertical portion 142 to correspond to a first opening hole 194 extended through the sidewall 191 of the accommodating member 190. The second opening hole 141 has substantially the same planar size as that of the first opening hole 194 and is disposed to overlap with the first opening hole 194 when the mold frame 140 is disposed inside the sidewalls of the accommodating member 190.

The second opening hole 141 is disposed through a predetermined area of a lower portion of the vertical portion 142 adjacent to the light source substrate 170. The vertical portion 142 is disposed on the light source substrate 170. In addition, the vertical portion 142 is disposed not to overlap with the light sources LS.

The accommodating member 190 accommodates the backlight unit 150 therein. In the exemplary embodiment, the accommodating member 190 includes the bottom portion 193, the sidewalls 191 and 192 extending from the bottom portion 193, and the first opening hole 194 extended through a sidewall among the sidewalls 191 and 192 thereof. Portions of the accommodating member 190 may define the bottom portion 193, the sidewalls 191 and 192 extending from the bottom portion 193, and the first opening hole 194 thereof.

The sidewalls 191 and 192 of the accommodating member include a first sidewall 191 provided in plural extending lengthwise in the first direction D1 and a second sidewall 192 provided in plural extending lengthwise in the second direction D2 from ends of the first sidewalls 191. The first sidewalls 191 face each other and the second sidewalls 192 face each other.

The driving substrate 100 is disposed outside the accommodating member 190. The driving substrate 100 disposed outside the accommodating member 190 is extended such that a predetermined portion of the driving substrate 200 is inserted into and extended through the first opening hole 194. The predetermined portion of the driving substrate 200 is inserted into and extended through the first opening hole 194 to be disposed within the accommodating member 190 and connected to the light source substrate 170 disposed within the accommodating member 190.

The driving substrate 200 includes a driving portion 201 and the pad portion 202 at opposing ends of the driving substrate 200. The driving portion 201 and the pad portion 202 are electrically connected to each other by a wire 205 provided in plural.

The driving substrate 200 includes a first extending portion 203 and a second extending portion 204. The first and second extending portion 203 and 204 may define a whole of the driving substrate 200, such as a base member thereof. The source voltage is applied to the light source substrate 170 through the circuit pattern portion 171 of the light source substrate 170 and the pad portion 202 of the driving substrate 200, which are electrically connected to each other.

The driving portion 201 is disposed on or in the first extending portion 203 and the pad portion 202 is disposed on or in the second extending portion 204. The first extending portion 203 extends lengthwise in the first direction D1, and the second extending portion 204 is connected to one side of one end of the first extending portion 203 and extends lengthwise in the second direction D2 crossing the first direction D1.

However, the shape of the driving substrate 200 should not be limited thereto or thereby. For instance, the driving substrate 200 may have an overall bar shape an end portion of which is inserted into and extends through the first opening hole 194.

A supporting member 300 is disposed on a rear surface of the driving substrate 200 to support the driving substrate 200. The supporting member 300 defines a groove therein in which the driving portion 201 of the driving substrate 200 is accommodated. With the driving portion 201 in the groove of the supporting member 300, an upper surface of the supporting member 300 may contact a lower surface of the driving substrate 200 from which the groove is recessed. The supporting member 300 makes contact with the first sidewall 191 of the accommodating member 190, and the supporting member 300 is coupled to the accommodating member 190 by a fixing member 310 such as a screw extended through a body of the supporting member 300 and into the first sidewall 191.

The supporting member 300 includes or defines a penetrating hole 311 through which the fixing screw 310 extends completely through the body of the supporting member. The fixing screw 310 is fixed to the first sidewall 191 of the accommodating member 190 after penetrating completely through the penetrating hole 311 in the supporting member 300.

In detail, the first sidewall 191 includes or defines a coupling groove 195 in plural into which the fixing screw 310 is respectively inserted. The fixing screw 310 extends in the second direction D2 through the supporting member 300 and into the coupling groove 195 in the first sidewall 191 of the accommodating member 190.

Accordingly, positions of the supporting member 300, the first extending portion 203 and the first sidewall 191 are fixed by the fixing screw 310, and thus the driving substrate 200, the supporting member 300 and the accommodating member 190 are coupled to each other.

The driving substrate 200 further includes a first conductive member 210 disposed on a lower portion of the pad portion 202 to make contact with the pad portion 202. The light source substrate 170 further includes a second conductive member 211 disposed on the circuit pattern portion 171 to make contact with the circuit pattern portion 171.

The first conductive member 210 and the second conductive member 211 include a conductive material. The first conductive member 210 makes contact with the second conductive member 211. Thus, the driving substrate 200 and the light source substrate 170 are electrically connected by the first conductive member 210 and the second conductive member 211 in contact with each other. In an exemplary embodiment, the first conductive member 210 and the second conductive member 211 have the same thickness in the cross-sectional thickness direction of the display device 100.

Figure 3:
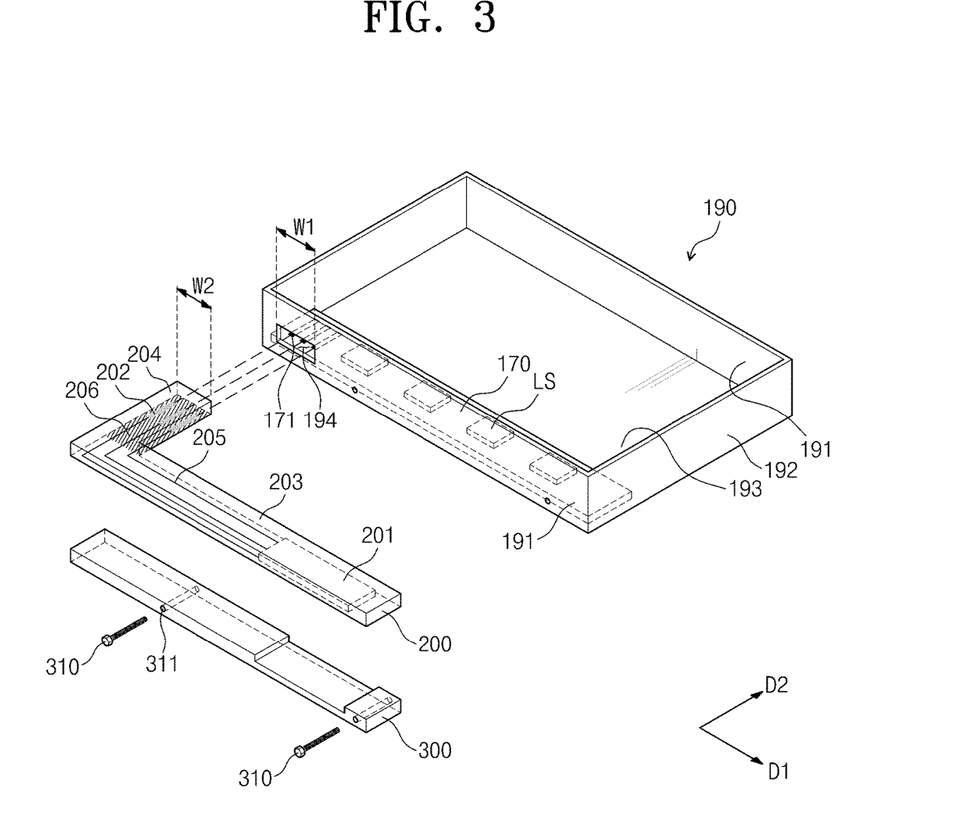
FIG. 3 is an exploded perspective view showing an exemplary embodiment of an uncoupled state of a light source substrate and a driving substrate of a display device according to the invention.
Figure 4:
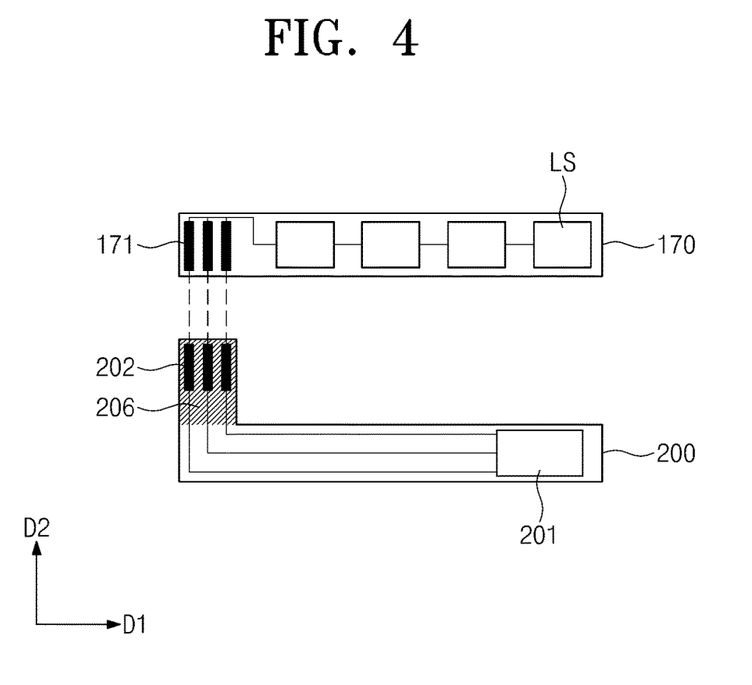
FIG. 4 is a top plan view showing an exemplary embodiment of a connection structure of a light source of the light source substrate and a driving portion of the driving substrate shown in FIG. 3.

FIG. 3 is an exploded perspective view showing an exemplary embodiment of an uncoupled state of the light source substrate and the driving substrate of the display device according to the invention, and FIG. 4 is a top plan view showing an exemplary embodiment of a connection structure of the light source of the light source substrate and the driving portion of the driving substrate shown in FIG. 3.

In FIGS. 3 and 4, the same reference numerals denote the same elements in FIGS. 1, 2A, and 2B, and thus the detailed descriptions of the same elements will be omitted.

Referring to FIGS. 3 and 4, the second extending portion 204 of the driving substrate 200 is inserted into and extended through the first opening hole 194 of the accommodating member 190, in the second direction D2. A width W1 of the first opening hole 194 is substantially the same as a width W2 of the second extending portion 204 of the driving substrate 200.

The circuit pattern portion 171 of the light source substrate 170, which is disposed adjacent to the first opening hole 194, is exposed by the first opening hole 194 to outside the accommodating member 190.

The light source substrate 170 is disposed adjacent to one first sidewall 191 among the plural first sidewalls 191, on the bottom portion 193 of the accommodating member 190, and extended lengthwise in the same direction that of the one first sidewall 191, that is, in the first direction D1. The light sources LS are mounted on the light source substrate 170 to be arranged in the first direction D1 and generate the light. The circuit pattern portion 171 is disposed at one side or end of the light source substrate 170 and the light sources LS and the circuit pattern portion 171 are connected to each other by wires (unlabeled lines in FIG. 4 between the circuit pattern portion 171 and the light sources LS, respectively).

The driving substrate 200 includes the driving portion 201 which controls the light emission of the light sources LS mounted on the light source substrate 170 and the pad portion 202 making contact with the circuit pattern portion 171.

In addition, the driving substrate 200 may include a reflection layer 206 disposed on a lower surface of the second extending portion 204. The reflection layer 206 exposes the pad portion 202 to outside the driving substrate 200 and has a white color.

The driving portion 201 and the pad portion 202 are connected to each other by the wires 205 and the driving portion 201 applies a control signal to the pad portion 202 through the wire 205.

Therefore, the control signal is applied to the circuit pattern portion 171 of the light source substrate 170 connected to the pad portion 202, and the light sources LS connected to the circuit pattern portion 171 of the light source substrate 170 generate and emit the light under control of the control signal.

Although not shown in figures, the driving substrate 200 may further include a separate source voltage supply to provide the source voltage to the driving portion 201.

The driving portion 201 may be a drive integrated circuit ("IC") for a light source. A drive IC may be used in a switching regulator. The drive IC in the switching regulator has a relatively wide range of input voltage, employs a constant current output manner and receives a pulse width modulation ("PWM") to control an output thereof, to thereby adjust brightness.

In general, the drive IC for an LED is manufactured in a chip form on a silicon substrate by a semiconductor process, and the drive IC for LED is electrically connected to other drive ICs through a circuit pattern printed on a circuit board.

In the exemplary embodiment, the driving substrate 200 and the light source substrate 170 obviate the use of a separate connector of a conventional display device, and the pad portion 202 of the driving substrate 200 makes contact with the circuit pattern portion 171 of the light source substrate 170 to electrically connect the driving substrate 200 and the light source substrate 170 to each other.

Thus, the driving substrate 200 may be stably connected to the light source substrate 170, an assembly time of the display device 100 may be significantly reduced since no separate connector is used, and defects caused by the separate connector may be reduced or effectively prevented.

Figure 5A:
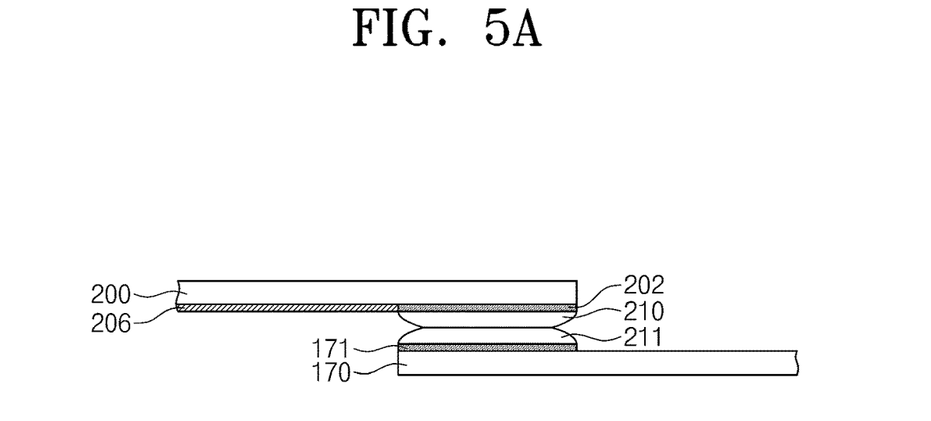
FIG. 5A is a cross-sectional view showing an exemplary embodiment of a coupled state of a conductive member of a display device according to the invention.
Figure 5B:
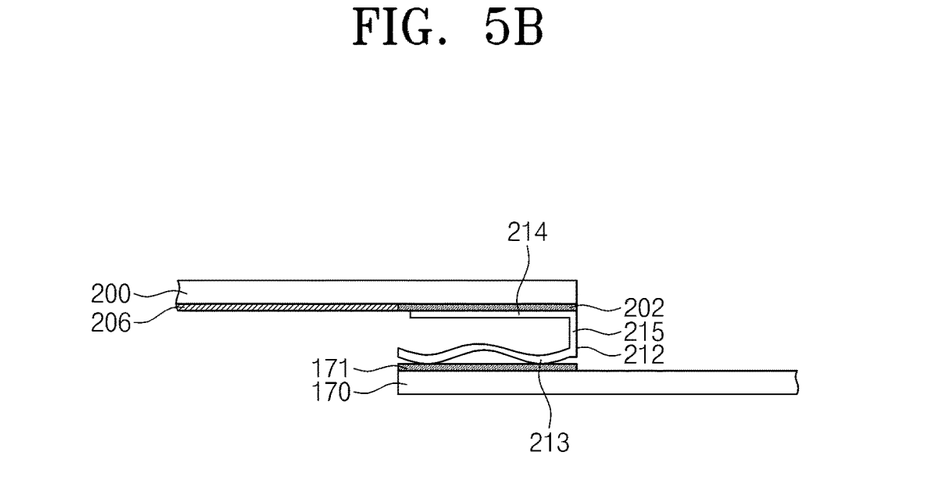
FIG. 5B is a cross-sectional view showing another exemplary embodiment of a coupled state of a conductive member of a display device according to the invention.

FIG. 5A is a cross-sectional view showing an exemplary embodiment of a coupled state of a conductive member of a display device according to the invention, and FIG. 5B is a cross-sectional view showing another exemplary embodiment of a coupled state of a conductive member of a display device according to the invention.

Referring to FIGS. 5A and 5B, the light source substrate 170 and the driving substrate 200 make contact with each other.

Referring to FIG. 5A, the first conductive member 210 makes contact with the second conductive member 211 and electrically connects the light source substrate 170 and the driving substrate 200 to each other. The first and second conductive members 210 and 211 may be a layer of conductive material respectively on the driving substrate 200 and the light source substrate 170, but should not be limited thereto. The first conductive member 210 and the second conductive member 211 may make contact with each other by a soldering process using a solder material. Thus, a contact efficiency between the circuit pattern portion 171 and the pad portion 202 is improved when the above described conductive members 210 and 211 are used as compared to when the circuit pattern portion 171 and the pad portion 202 are connected to each other only by a circuit pattern.

However, the shape and the material of the first and second conductive members 210 and 211 should not be limited thereto or thereby. The first and second conductive members 210 and 211 may have a spring shape using a metal material and/or the first conductive member 210 may have a thickness different from that of the second conductive member 211.

Referring to FIG. 5B, in another exemplary embodiment, the circuit pattern portion 171 makes contact with the pad portion 202 using a third conductive member 212 having the spring shape.

The third conductive member 212 includes a first extending portion 213 connected to the circuit pattern portion 171, a second extending portion 214 connected to the pad portion 202, and a third extending portion 215 connecting the first extending portion 213 and the second extending portion 214 to each other. The third extending portion 215 connects one side or end of the first extending portion 213 and one side or end of the second extending portion 214.

The first extending portion 213 faces the second extending portion 214 to be spaced apart therefrom. The second extending portion 214 may be bent with respect to the third extending portion 215 to have a predetermined curvature in one direction.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
    a display panel which displays an image with light;
    an accommodating member comprising a bottom portion and a sidewall which extends from the bottom portion;
    a backlight unit which provides the light to the display panel, the backlight unit comprising a light source which is inside the accommodating member and generates the light and a light source substrate which is inside the accommodating member and on which the light source is mounted; and
    a driving substrate which is connected to the light source substrate disposed inside the accommodating member and controls the light source to generate the light, the driving substrate comprising:
        a first extending portion extending in a first direction parallel to the sidewall; and
        a second extending portion extended from the first extending portion, extending in a second direction crossing the first direction, and through the sidewall of the accommodating member to dispose an end portion of the second extending portion inside the accommodating member, and wherein
the end portion of the second extending portion is electrically connected to the light source substrate, and
and the first extending portion is in contact with the sidewall.

2. The display device of claim 1, wherein the backlight unit further comprises:
a pad portion disposed on a lower surface of the end portion of the second extending portion and inside the accommodating member, wherein the pad portion is electrically connected to the light source substrate disposed inside the accommodating member; and
a circuit pattern portion disposed at an end of the light source substrate disposed inside the accommodating member and electrically connected to the pad portion of the driving substrate which is disposed inside the accommodating member.

3. The display device of claim 2, wherein
the sidewall of the accommodating member is provided in plural to define:
first sidewalls extending lengthwise in the first direction; and
second sidewalls respectively connected to end portions of the first sidewalls and extending lengthwise in the second direction crossing the first direction, and
the light source substrate disposed inside the accommodating member extends lengthwise in the first direction and is disposed adjacent to a first sidewall among the first sidewalls.

4. The display device of claim 3, wherein the first sidewall disposed adjacent to the light source substrate defines a first opening hole in the accommodating member and through which the second extending portion of the driving substrate is extended to dispose the end portion of the driving substrate inside the accommodating member.

5. The display device of claim 4, wherein
the first extending portion extends lengthwise in the first direction, and
the second extending portion is extended lengthwise in the second direction from an end of the first extending portion.

6. The display device of claim 5, wherein the second extending portion extended through the first opening hole defined in the accommodating member has a same width in the first direction as a width of the first opening hole in the first direction.

7. The display device of claim 2, wherein the driving substrate further comprises a driving portion which is disposed on the first extending portion disposed outside the accommodating member and applies a source voltage to the light source substrate disposed inside the accommodating member through the pad portion of the driving substrate and the circuit pattern portion of the light source substrate which are electrically connected to each other.

8. The display device of claim 7, wherein the driving substrate further comprises a wire which electrically connects the driving portion disposed outside the accommodating member and the pad portion disposed inside the accommodating member to each other.

9. The display device of claim 2, wherein
the driving substrate further comprises a first conductive member disposed on the pad portion and in contact with the pad portion,
the light source substrate further comprises a second conductive member disposed on the circuit pattern portion and in contact with the circuit pattern portion, and
the first conductive member contacts the second conductive member to electrically connect the pad portion of the driving substrate to the circuit pattern portion of the light source substrate.

10. The display device of claim 9, wherein the first conductive member and the second conductive member have a same thickness.

11. The display device of claim 2, wherein
the driving substrate further comprises a conductive member in contact with the pad portion, and
the conductive member extends from the pad portion of the driving substrate to contact the circuit pattern portion of the light source substrate and electrically connect the pad portion of the driving substrate to the circuit pattern portion of the light source substrate.

12. The display device of claim 11, wherein the conductive member defines:
a first extending member thereof in contact with the pad portion;
a second extending member thereof in contact with the circuit pattern portion and spaced apart from the first extending member by a predetermined distance to face the first extending member; and
a third extending member thereof extending respectively from ends of the first and second extending members and connecting the first and second extending members to each other.

13. The display device of claim 2, wherein the backlight unit further comprises a mold frame, and the mold frame defines a second opening hole thereof through which the second extending portion of the driving substrate is extended to dispose the end portion of the driving substrate inside the accommodating member.

14. The display device of claim 2, wherein the driving substrate further comprises a reflection layer which is disposed on the lower surface of the end of the second extending portion disposed inside the accommodating member and exposes the pad portion, the reflection layer having a white color.

15. The display device of claim 1, wherein the backlight unit further comprises:
a light guide plate which is disposed adjacent to the light source and guides the light generated by the light source to the display panel;
an optical sheet disposed between the light guide plate and the display panel; and
a reflection plate facing the optical sheet such that the light guide plate is disposed between the reflection plate and the optical sheet.

16. The display device of claim 1, further comprising a supporting member extending parallel to the sidewall and connected to the sidewall, wherein the first extending portion is disposed on the supporting member.

* * * * *